United States Patent [19]

Kumata et al.

[11] Patent Number: 5,041,506
[45] Date of Patent: Aug. 20, 1991

[54] METHOD FOR THE PRODUCTION OF A MOLECULAR COMPOSITE OF RIGID AROMATIC POLYMER

[75] Inventors: Masataka Kumata, Tokyo; Hideo Nishino; Atsuko Takada, both of Saitama, all of Japan

[73] Assignee: Honda Giken Kogyo Kabushiki Kaisha, Tokyo, Japan

[21] Appl. No.: 216,849

[22] Filed: Jul. 8, 1988

[30] Foreign Application Priority Data

Jul. 10, 1987 [JP] Japan ............................ 62-172563

[51] Int. Cl.$^5$ ............... C08L 77/00; C08L 79/00; C08L 79/06
[52] U.S. Cl. .................................. 525/432; 525/425; 525/434; 264/216
[58] Field of Search ................ 525/425, 432, 434; 264/216

[56] References Cited

U.S. PATENT DOCUMENTS

| | | | |
|---|---|---|---|
| 4,108,835 | 8/1978 | Arnold et al. | 528/183 |
| 4,207,407 | 6/1980 | Helminiak et al. | 525/425 |
| 4,228,218 | 10/1980 | Takayanagi et al. | 525/92 |
| 4,377,546 | 3/1983 | Helminiak et al. | 525/425 |
| 4,578,432 | 3/1986 | Tsai et al. | 525/434 |
| 4,631,318 | 12/1986 | Hwang et al. | 525/420 |
| 4,845,150 | 7/1989 | Kovak et al. | 525/432 |

FOREIGN PATENT DOCUMENTS 024949 10/1987 European Pat. Off. .
62-25158 2/1987 Japan .

*Primary Examiner*—Ana L. Carrillo
*Attorney, Agent, or Firm*—Lyon & Lyon

[57] ABSTRACT

A method for the production of a molecular composite of an aromatic polymer and matrix polymer suitable for use as structural materials for aircraft, automobiles and spacecraft using a solution of low corrosiveness, thereby resulting in a polymer alloy with excellent structural properties wherein physical degradation of the alloy is reduced and the corrosive effect of the alloy on metals in contact with the alloy is also reduced.

10 Claims, No Drawings

METHOD FOR THE PRODUCTION OF A MOLECULAR COMPOSITE OF RIGID AROMATIC POLYMER

BACKGROUND OF THE INVENTION

Heretofore, plastic composites reinforced with glass fibers and carbon fibers have been known in the art and have found extensive utility in various applications. The strength of such composites is greatly increased by the presence of reinforcing fibers and by the interfacial strength between the fibers and the plastic matrix. This interfacial strength is directly proportional to the contact surface area between the fibers and the plastic matrix. Addition to the contact surface area necessitates an increase in the aspect ratio of the fibers. The aspect ratio is the ratio of length to diameter of the fibers. The diameter of these fibers, however, can only be reduced so far. Thus, the amount that the interfacial strength can be increased by increasing the aspect ratio is also limited. The practice of reinforcing the plastic composites by incorporating fibers therein in an interwoven form has been popular even though it complicates the process of production.

In recent years, aromatic polyamides, generically called Alamides, have been developed as rigid polymers and have found utility as reinforcing fibers. Since these aromatic polyamides exhibit poor adhesiveness to other resins, the aromatic polyamide fibers must be provided with improved adhesive properties to be used effectively in the plastic composites.

Japanese Patent Application Disclosure SHO 57(1982)-195,136 discloses an ionomeric resin composition reinforced with aromatic polyamide fibers, the composition comprising 40 to 99.9 parts by weight of an olefinic ionomeric polymer and 60 to 0.1 parts by weight of para-oriented wholly aromatic polyamide fibers. The aromatic polyamide fibers are formed of repeating units represented by the general formulas, $-NH-Ar_1NH-CO-Ar_2-CO-$ and/or $-NH-Ar_3-CO-$ wherein $Ar_1$, $Ar_2$, and $Ar_3$ stand for different para-oriented aromatic groups, and the surface thereof is modified by N-substitution. Examples of the N-substituent groups include alkyls, aralkyls, hydroxyalkyls, and carboxylates. The introduction of the N-substituent enables the wholly aromatic polyamide fibers to acquire improved dispersibility in the ionomeric resin and improved adhesiveness thereto. The introduction of the substituent nevertheless impairs the strength of the wholly aromatic polyamide fibers. Moreover, since the reinforcing material is fibrous, its aspect ratio cannot be substantially increased and it can only reinforce the composites to a limited extent.

In view of the above mentioned limitations of using fibers to increase the strength of plastics, a polymer blend type composite (molecular composite) having the so-called mutual immersion type structure has been produced. The structure is obtained by causing the so-called rigid polymer such as the aromatic polyamide to be dispersed so finely in a flexible matrix polymer as to reach the molecular level. Since the molecular composite of the nature just mentioned is unaffected by the principle that strength is produced by unidirectional orientation of molecular chains of the rigid polymer, it exhibits little anisotropy and has excellent physical properties such as mechanical strength, thermal stability, and resistance to solvents.

U.S. Pat. No. 4,207,407 discloses a polymeric alloy which is comprised of a coil-shaped heterocyclic polymer and a rigid aromatic heterocyclic polymer represented by the following formulas:

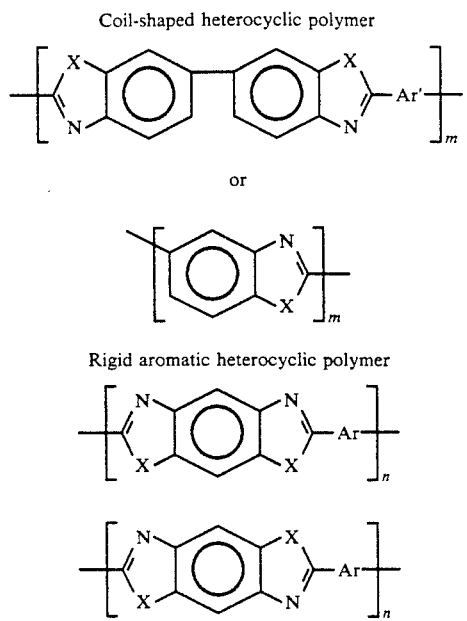

These polymers are dissolved in methanesulfonic acid solvent and the polymeric solution obtained is cast on a surface, treated to remove the solvent, and then dried to give rise to the polymeric alloy. When this polymeric alloy is used for structural materials in aircraft and automobiles, for example, the physical properties of the polymer alloy are degraded and the metallic members of the aircraft or automobiles placed in contact with the polymer alloy are corroded due to the extremely corrosive solvent used to produce the alloy.

SUMMARY OF THE INVENTION

This invention relates to a method for the production of a molecular composite of an aromatic polymer and matrix polymer and particularly to a method for the production of a molecular composite suitable for use as structural materials for aircraft, automobiles and space craft.

The method for the production of a molecular composite consisting of a rigid aromatic polymer and a matrix polymer and exhibiting high strength and excellent thermal stability and solvent-resistance uses a solvent of low corrosiveness thereby alleviating the disadvantages of using such materials that were present in the prior art.

DETAILED DESCRIPTION OF THE PREFERRED EMBODIMENT

It has been found that an aqueous phosphoric acid solution is a good solvent for both the rigid aromatic polymer and the matrix polymer in the production of the molecular composite. Further the phosphoric acid solution exhibits notably low corrosiveness compared with the sulfuric acid or methanesulfonic acid used in the prior art. The phosphoric acid solution permits easy removal of the plastic from the casting surface, and also functions as a condensing agent.

Specifically, according to one embodiment of the present invention the method for the production of a molecular composite consisting of a rigid aromatic polymer and a matrix polymer is characterized by dissolving a rigid aromatic polymer possessing a structural unit represented by the following general formula:

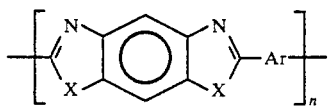

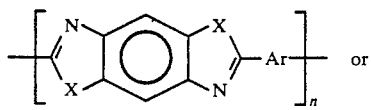

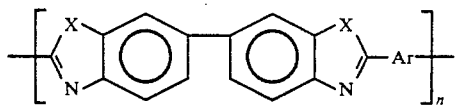

(wherein X stands for one member selected from the group consisting of NH, N-phenyl, O, and S and Ar stands for an aromatic group) and a matrix polymer possessing a structural unit represented by the following general formula:

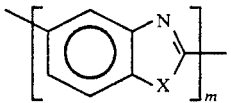

(wherein X stands for one member selected from the group consisting of NH, N-phenyl, O, and S) in an aqueous phosphoric acid solution thereby producing a homogeneous solution and divesting the homogeneous solution of the aforementioned aqueous phosphoric acid solution.

Another method contemplated by this invention for the production of a molecular composite of the embodiment consisting of a rigid aromatic polymer possessing a structural unit represented by the following formula:

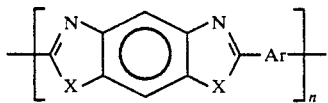

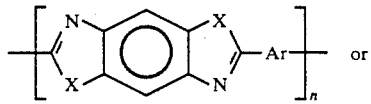

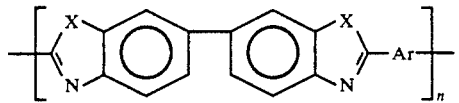

(wherein X stands for one member selected from the group consisting of NH, N-phenyl, O and S and Ar for an aromatic group) and a matrix polymer possessing a structural unit represented by the following general formula:

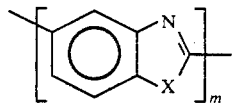

(wherein X stands for one member selected from the group consisting of NH, N-phenyl, O, and S) is characterized by (a) dissolving the rigid aromatic polymer and the matrix polymer (providing that at least one of the two polymers constitutes a starting substance or a prepolymer) in an aqueous phosphoric acid solution thereby preparing a homogeneous solution and (b) heating the homogeneous solution to a temperature not to exceed 250° C., thereby inducing a condensation reaction of the starting substance and producing the matrix polymer.

The rigid aromatic polymer to be used in the method of this invention comprises a structural unit having two nitrogen-containing condensation rings attached to opposite sides of a benzene ring and exhibits relatively high rigidity. Examples of the rigid aromatic polymer are polybenzoimidazole, polybenzothiazole, and polybenzooxazole, polybisbenzoimidazole, polybisbenzothiazole and polybisbenzooxazole. The rigid aromatic polymer, i.e. the polybenzooxazole, for example, is produced by the following reaction.

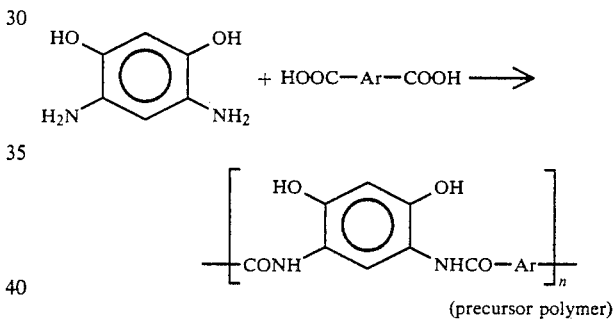

(precursor polymer)

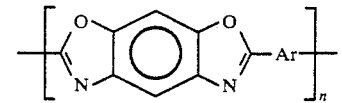

According to one embodiment, the matrix polymer comprises a structural unit having a nitrogen-containing condensation ring attached to one of the opposite sides of a benzene ring and exhibits relatively low rigidity. Examples of the matrix polymer include 2,5-polybenzoimidazole and 2,5-polybenzoxazole. Copolyamides comprising the structural unit mentioned above and a polyamide unit such as nylon 6, nylon 66, nylon 610, or nylon 612 are also available as the matrix polymer.

The distinction between the rigid aromatic polymer and the matrix polymer is drawn by the magnitude of rigidity. One polymer of a fixed structure, depending on the polymer with which it is combined to form a composite, can function either as a rigid aromatic polymer or as a matrix polymer.

The eventual mixing ratio by weight of the rigid aromatic polymer and the matrix polymer falls in the range of between 5 to 95 and 80 to 20. If the mixing ratio of the rigid aromatic polymer is less than 5 to 95, the rigid aromatic polymer fails to provide adequate rigidity in the produced molecular composite. Conversely, if the mixing ratio exceeds 80 to 20, the produced molecular composite exhibits insufficient mechanical strength.

The aqueous phosphoric acid solution is an aqueous solution containing a high concentration of phosphoric acid or polyphosphoric acid. The concentration is in the range of 80 to 95% by weight, preferably 85 to 90% by weight.

The rigid aromatic polymer and the matrix polymer both dissolve in the aqueous phosphoric acid solution to form a homogeneous solution. The preparation of this solution is not limited to a particular method and any method known to one skilled in the art is acceptable. The two polymers may be mixed in the aqueous phosphoric acid solution simultaneously. The two polymers may also be dissolved separately and then subsequently mixed together. The concentration of the rigid aromatic polymer in the aqueous phosphoric acid solution is in the range of 2 to 80% by weight, preferably 2 to 20% by weight and that of the matrix polymer in the same aqueous solution is in the range of 2 to 80% by weight, preferably 2 to 20% by weight.

The preparation of the homogeneous solution can be carried out at normal room temperature. To enhance solubility the preparation of the solution should be carried out at a temperature in the range of 25° to 100° C.

The aqueous phosphoric acid solution in which the rigid aromatic polymer and the matrix polymer have been dissolved is subsequently cast on a surface and dried under a high degree of vacuum, to produce a film. Since the produced film contains residual phosphoric acid, it is washed with an alkaline aqueous solution for removal of the residual phosphoric acid. Aqueous sodium bicarbonate solution or an aqueous amide solution, for example, are suitable for this purpose. The film is then washed with water and, when necessary, washed with an aqueous solution of a solvent such as N,N-dimethyl acetamide or N,N-dimethylformamide which is capable of reacting with mineral acid and forming a complex salt (concentration in the range of 5 to 80% by weight). Finally, the film is dried thoroughly under vacuum.

According to another embodiment of the present invention (see Example 2), when a starting substance for the matrix polymer is used in the place of the matrix polymer, a homogeneous aqueous phosphoric acid solution of the rigid aromatic polymer and the starting substance is prepared in advance and this homogeneous solution is then heated. The polymerization of the starting substance to the matrix polymer generally proceeds through the formation of a prepolymer. Polybisbenzoimidazole, for example, is synthesized through the following reaction path.

In the polymerization reaction using an aqueous polyphosphoric acid solution, the conversion of the monomer to the prepolymer proceeds very rapidly, almost instantaneously. Some polymers, conversely, are synthesized through two clearly distinct stages.

When the reaction proceeds through two stages as described above, the reaction system is heated at a temperature in the range of 20° to 150° C. for a period of 2 to 72 hours for the formation of the prepolymer and at a temperature in the range of 80° to 250° C. for a period of 2 to 96 hours for the formation of the final step polymer.

Since the matrix polymer produced as described above exhibits extremely high compatibility with the rigid aromatic polymer, the produced molecular complex has the polymers dispersed homogeneously throughout each other on the molecular level.

The molecular composite which is obtained by the method of the present invention exhibits outstanding mechanical strength and thermal stability and manifests anisotropy only sparingly and, therefore, is highly suitable for use as structural materials for aircraft and automobiles, for example.

The following specific formulations are enumerated below by way of example only and are not intended to limit the invention in any way beyond the scope of the appended claims.

EXAMPLE 1

Under an atmosphere of argon, 2.0 g of poly-P-phenylenebenzobisthiazole (intrinsic viscosity 4.98) and 8.0 g of poly-2,5-benzoimidazole (intrinsic viscosity 2.42), synthesized in advance, were dissolved at 50° C in 100 g of an aqueous phosphoric acid solution (concentration 85% by weight phosphoric acid). The homogeneous solution consequently obtained was cast on a flat glass sheet and left standing overnight under a high degree of vacuum at normal room temperature.

The produced film, still held fast on the glass sheet, was then thoroughly washed with water, washed with a dilute aqueous solution of sodium bicarbonate (5% by weight), washed again with water, then left standing overnight at about 100° C. under a high degree of vacuum, and dried.

A yellow molecular composite film (0.2 μm in thickness) consisting of 20% by weight of poly-P-phenylenebenzobisthiazole as the rigid aromatic polymer and 80% by weight of poly-2,5benzoimidazole as the matrix polymer was obtained. This film was found to possess tensile strength of 7,632 psi (532 kg/cm$^2$), a value 1.8 times the tensile strength of poly-2,5-benzoimidazole, and modulus of elasticity of $3.90 \times 10^5$ psi ($2.7 \times 10^4$ kg/cm$^2$), a value 1.32 times the modulus of elasticity of poly-2,5-benzoimidazole.

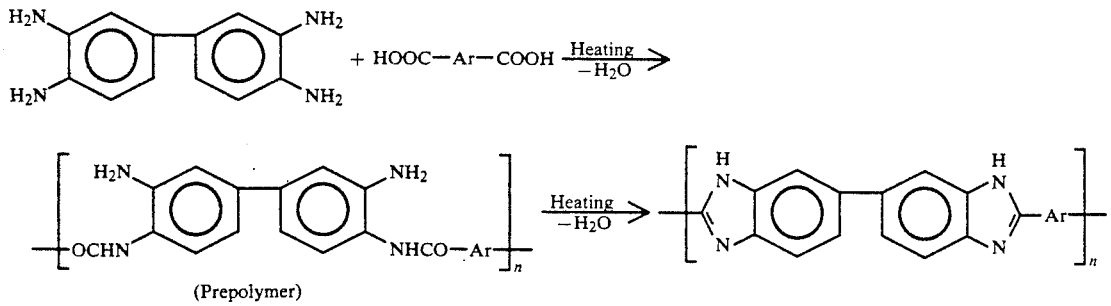

(Prepolymer)

EXAMPLE 2

A solution obtained by dissolving 2.0 g of the same poly-P-phenylenebenzobisthiazole as used in Example 1 in 25 g of an aqueous polyphosphoric acid solution (concentration 85% by weight phosphoric acid) and 2.0 g of 3,3',4,4'-tetraaminobiphenyl chloride and 0.85 g of isophthalic acid added thereto were stirred and heated at 170° C. for 4.5 hours and further stirred and heated at 200° C. for 24 hours. The homogeneous solution of the molecular composite obtained was subjected to casting by following the procedure of Example 1, to produce a yellow film having a thickness of 0.2 μm and emitting a purplish blue fluorescent color. The rigid aromatic polymer content of this film was 15% by weight and the matrix polymer content thereof 85% by weight.

This film was found to possess tensile strength of 6,712 psi (468 kg/cm$^2$), a value 1.9 times the tensile strength of polybisbenzoimidazole, and modulus of elasticity of $3.20 \times 10^5$ psi ($2.2 \times 10^4$ kg/cm$^2$), a value 1.21 times the modulus of elasticity of the matrix polymer.

In the method of this invention, the aqueous phosphoric acid solution is used as a common solvent for the rigid aromatic polymer and the matrix polymer as described above. The phosphoric acid has an advantage that it is a weaker acid than sulfuric acid or methanesulfonic acid, is less corrosive, and is easily removed from the produced molecular composite. Further, since the rigid aromatic polymer exhibits sufficient crystallinity in the aqueous phosphoric acid solution, the produced molecular composite has excellent mechanical strength. Since the aqueous phosphoric acid solution also functions as a condensing agent, the polymerization of the matrix polymer can be carried out directly in the aqueous phosphoric acid solution. Thus, the produced molecular composite has the matrix polymer homogeneously dispersed therein.

As will be evident to those skilled in the art modifications of the present invention hereinabove disclosed can be made without departing from the spirit and scope of the invention as defined by the following claims.

What is claimed is:

1. A method for the production of a molecular composite consisting of a rigid aromatic polymer possessing a structural unit selected from the group consisting of

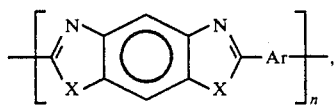

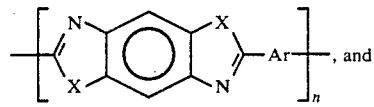  and

-continued

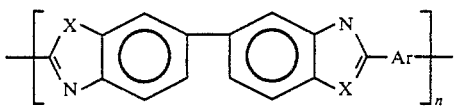

where X stands for one member selected from the group consisting of NH, N-phenyl, O, and S and Ar stands for an aromatic group, and a matrix polymer possessing a structural unit represented by the following general formula:

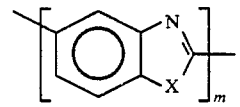

wherein X stands for one member selected from the group consisting of NH, N-phenyl, O, and S, the method comprising dissolving the rigid aromatic polymer and the matrix polymer in an aqueous phosphoric acid solution thereby producing a homogeneous solution and then divesting said homogeneous solution of the aqueous phosphoric acid solution, wherein the produced molecular composite has the polymers dispersed homogeneously throughout each other on a molecular level.

2. The method according to claim 1, wherein the phosphoric acid solution is 80 to 95% by weight phosphoric or polyphosphoric acid.

3. The method according to claim 1, wherein the concentration of said rigid aromatic polymer and that of said matrix polymer in said phosphoric acid solution are both in the range of 2 to 80% by weight.

4. The method according to claim 1 wherein the mixing ratio of the rigid aromatic polymer and the matrix polymer is between 5 to 95 and 80 to 20.

5. The method according to claims 1, 3, or 4 wherein the homogeneous solution is obtained by preparing separate solutions of the rigid aromatic polymer and the matrix polymer and subsequently mixing the two solutions.

6. The method according to claim 1, wherein the concentration of said rigid aromatic polymer and that of said matrix polymer in said phosphoric acid solution are both in the range of 2 to 80% by weight.

7. The method according to claim 1, wherein the homogeneous solution is heated to a temperature of from about 25° C. to about 100° C.

8. The method of claim 1 wherein the phosphoric acid solution is divested from the homogeneous solution by casting the homogeneous solution onto a surface and drying under a vacuum to produce a film.

9. The method of claim 8 further comprising washing the film with an aqueous alkaline solution.

10. The method according to claims 1, 8 or 9 further comprising washing said film with water after the divesting of said aqueous phosphoric acid solution therefrom.

* * * * *